(12) United States Patent
Vallat et al.

(10) Patent No.: US 10,239,971 B2
(45) Date of Patent: Mar. 26, 2019

(54) HEAVY GOODS VEHICLE TIRE COMPRISING A TREAD BASED ON A MODIFIED POLYISOPRENE, PROCESS FOR PREPARING SAME

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Perrine Vallat, Clermont-ferrand (FR); Etienne Fleury, Clermont-Ferrand (FR); Jose-Carlos Araujo Da Silva, Clermont-ferrand (FR); Jean-Michel Favrot, Clermont-Ferrard (FR); Anne-Frederique Salit, Clermont-Ferrard (FR); Nicolas Seeboth, Clermont-Ferrand (FR)

(73) Assignees: COMPAGNIE DES ETABLISSEMENTS MICHELIN, Clermont-Ferrand (FR); MICHELIN RECHERCHE ET TECHNIQUE, S.A, Granges-Paccot (CH)

( * ) Notice: Subject to any disclaimer, the term of this patent is extended or adjusted under 35 U.S.C. 154(b) by 555 days.

(21) Appl. No.: 14/651,531

(22) PCT Filed: Dec. 9, 2013

(86) PCT No.: PCT/EP2013/075988
§ 371 (c)(1),
(2) Date: Jun. 11, 2015

(87) PCT Pub. No.: WO2014/090756
PCT Pub. Date: Jun. 19, 2014

(65) Prior Publication Data
US 2015/0322183 A1    Nov. 12, 2015

(30) Foreign Application Priority Data
Dec. 13, 2012    (FR) .................. 12 62024

(51) Int. Cl.
| | | |
|---|---|---|
| *C08F 136/08* | (2006.01) | |
| *C08L 47/00* | (2006.01) | |
| *B29D 30/08* | (2006.01) | |
| *B60C 11/00* | (2006.01) | |
| *B60C 1/00* | (2006.01) | |
| *C08C 19/22* | (2006.01) | |
| *C08K 3/36* | (2006.01) | |
| *C08L 15/00* | (2006.01) | |
| *C08L 9/02* | (2006.01) | |

(52) U.S. Cl.
CPC ............ *C08F 136/08* (2013.01); *B29D 30/08* (2013.01); *B60C 1/0016* (2013.01); *B60C 11/0008* (2013.01); *C08C 19/22* (2013.01); *C08K 3/36* (2013.01); *C08L 9/02* (2013.01); *C08L 15/00* (2013.01); *C08L 47/00* (2013.01); *Y02T 10/862* (2013.01)

(58) Field of Classification Search
CPC ........ C08F 136/08; C08L 47/00; C08L 15/00; C08L 9/02; C08C 19/22; B60C 1/0016; B60C 11/0008; B29D 30/08
See application file for complete search history.

(56) References Cited

U.S. PATENT DOCUMENTS

| | | |
|---|---|---|
| 2006/0084730 A1 | 4/2006 | Fukushima |
| 2011/0183098 A1 | 7/2011 | Hidalgo et al. |
| 2013/0012652 A1 | 1/2013 | Araujo Da silva et al. |
| 2013/0123418 A1 | 5/2013 | Araujo Da silva et al. |
| 2013/0131279 A1 | 5/2013 | Araujo Da silva et al. |

FOREIGN PATENT DOCUMENTS

| | | |
|---|---|---|
| FR | 2935979 | 3/2010 |
| WO | 20110113818 | 9/2011 |
| WO | 2012007441 | 1/2012 |
| WO | 2012007442 | 1/2012 |

OTHER PUBLICATIONS

International Search Report for PCT/EP2013/075988 dated Mar. 11, 2014.

*Primary Examiner* — Peter D. Mulcahy
(74) *Attorney, Agent, or Firm* — Dickinson Wright PLLC

(57) ABSTRACT

A heavy-duty vehicle tire comprising a tread consisting of a crosslinked rubber composition comprising a reinforcing filler of siliceous type and a synthetic polyisoprene modified by grafting with a compound comprising at least one group Q, and at least one group A, which are joined to one another by at least one and preferably one "spacer" group Sp, in which:
  Q comprises a dipole containing at least one and preferably one nitrogen atom,
  A comprises an associative group comprising at least one nitrogen atom,
  Sp is an atom or group of atoms forming a bond between Q and A.
The heavy-duty vehicle tire according to the invention has a satisfactorily improved rolling resistance/wear resistance compromise.

14 Claims, No Drawings

HEAVY GOODS VEHICLE TIRE COMPRISING A TREAD BASED ON A MODIFIED POLYISOPRENE, PROCESS FOR PREPARING SAME

This application is a 371 national phase entry of PCT/EP2013/075988, filed 9 Dec. 2013, which claims benefit of French Patent Application No. 1262024, filed 13 Dec. 2012, the entire contents of which are incorporated herein by reference for all purposes.

BACKGROUND

1. Field

The present disclosure relates to tires suitable for bearing heavy loads, and to a use of a low hysteresis rubber composition for improving the stiffness of treads of such tires. The disclosure applies to tires for motor vehicles, such as heavy-duty vehicles, civil engineering vehicles or aircraft.

2. Description of Related Art

In the field of the manufacture of tires suitable for bearing heavy loads, especially for heavy-duty vehicles, and in particular in the field of the formulation of rubber compositions in contact with the ground, referred to as treads, use is made, in a known manner, of natural rubber on account of the low hysteresis losses that this elastomer has.

Very particularly for these tires intended to bear heavy loads, it is desirable for the materials constituting the treads to have a good stiffness at low and moderate deformations, while being capable of accepting certain deformations without being damaged under the effect of higher stresses or deformations that are amplified by the loads borne. In other words, it is desirable to have a material based on natural rubber which, while being stiff at low and moderate deformations so as to provide the tire with a low rolling resistance, has a high elongation at break or a high tensile strength so as to provide satisfactory wear resistance. However, these gains in properties must not be attained at the expense of the gain in hysteresis already achieved with the use of natural rubber.

The Applicant companies' patent application WO 2012/007442 describes the modification of a diene elastomer by grafting with a specific modifier comprising at least one nitrogen-containing dipole and at least one nitrogen-containing associative group. The elastomer thus modified endows a composition containing it with improved hysteresis properties, and also a good stiffness under moderate deformation and a high elongation at break.

However, it turns out that this modification applied to natural rubber does not provide the expected properties. Thus, a tire suitable for bearing heavy loads, the tread of which comprises a composition based on natural rubber modified by a modifier comprising at least one nitrogen-containing dipole and at least one nitrogen-containing associative group according to WO 2012/007442 does not exhibit the desired compromise of properties which combines a low rolling resistance and a satisfactory wear resistance in optimal proportions.

Yet for the designers of tires intended to bear heavy loads, improving the compromise of performances of the tires, especially the rolling resistance and the wear resistance, by improving the compromise of often conflicting properties of the compositions constituting the tires, such as a good stiffness at low and moderate deformation and a high elongation at break of the compositions, is a constant concern.

SUMMARY

The technical problem that the invention, in its embodiments, proposes to solve is the improvement of the rolling resistance/wear resistance compromise of tires intended to bear heavy loads.

The inventors have now developed a tire suitable for bearing heavy loads, the tread of which comprises a composition based on modified synthetic polyisoprene, as predominant elastomer, and on a reinforcing filler of siliceous type as predominant reinforcing filler. This composition has an improved compromise of properties (hysteresis/stiffness/elongation at break) relative to a conventional composition comprising modified natural rubber as predominant elastomer. Used in particular as a tread, the composition according to an embodiment of the invention gives the tire for heavy-duty vehicles, or other vehicles bearing heavy loads, a reduced rolling resistance and an improved wear resistance with respect to a tire of which the tread comprises a composition based on modified natural rubber as predominant elastomer.

In the text below, the expression "proportion of modifier" present in a rubber composition, expressed as a molar percentage, means the number of modifier molecules present in the composition per hundred units of isoprene. For example, if the proportion of modifier is 0.20 mol %, this means that there will be 0.20 unit originating from modifier per 100 isoprene units. Where both a polyisoprene already grafted with the modifier and a diene elastomer not grafted with a modifier are used in the composition, the proportion of modifier represents the number of molecules of modifier that are grafted per 100 diene elastomer units, the number of units taking into account the two elastomers (grafted and non-grafted), on the assumption that no other molecules of modifier not already grafted have been added to the composition.

In the text below, the expression "composition based on" means a composition comprising the mixture and/or the reaction product of the various constituents used, some of these base constituents being capable of or intended for reacting with one another, at least partly, during the various phases of manufacture of the composition, in particular during the crosslinking or vulcanization thereof.

In the present description, unless expressly indicated otherwise, all of the percentages (%) indicated are % by mass. Moreover, any range of values denoted by the expression "between a and b" represents the range of values extending from more than a to less than b (i.e. with limits a and b excluded), whereas any range of values denoted by the expression "from a to b" signifies the range of values extending from a through to b (i.e. including the strict limits a and b).

In the present description, the expression "heavy-duty vehicle tire" is understood to mean, generically and so as not to overload the tax, any tire intended to bear heavy loads, whether it is for a heavy-duty vehicle, a civil engineering vehicle, an agricultural vehicle or for aircraft.

One subject of the invention is therefore a heavy-duty vehicle tire, the tread of which comprises a rubber composition based on at least:
  a synthetic polyisoprene as predominant elastomer,
  a reinforcing filler comprising at least 50% by weight of
    a reinforcing inorganic filler of siliceous type relative to
    the total weight of the filler,
  a chemical crosslinker, and a modifier, said modifier comprising at least one group Q, and at least one group A, which are joined to one another by at least one and preferably one "spacer" group Sp, in which:
- Q comprises a dipole containing at least one and preferably one nitrogen atom,
- A comprises an associative group comprising at least one nitrogen atom,
- Sp is an atom or group of atoms forming a bond between Q and A.

Another subject of the invention is a process for manufacturing a heavy-duty vehicle tire comprising the preparation of a rubber composition based on at least a synthetic polyisoprene as predominant elastomer, a reinforcing filler of siliceous type, a chemical crosslinker and a modifier, characterized in that it comprises the following steps:
- modifying the diene elastomer by post-polymerization grafting in solution or in bulk of a modifier comprising at least one group Q, and at least one group A, which are joined to one another by at least one and preferably one "spacer" group Sp, in which:
  - Q comprises a dipole containing at least one and preferably one nitrogen atom,
  - A comprises an associative group comprising at least one nitrogen atom,
  - Sp is an atom or group of atoms forming a bond between Q and A,
- incorporating the reinforcing filler into the diene elastomer thus grafted with the modifier, by thermomechanically kneading everything, in one or more steps, until a maximum temperature of between 130° C. and 200° C. is reached,
- cooling the combined mixture to a temperature of less than 100° C.,
- then incorporating the chemical crosslinker,
- kneading everything up to a maximum temperature of less than 120° C.,
- extruding the resulting rubber composition in order to form the tread,
- assembling the various semi-finished elements that make up the tire, including the tread formed above.

Another subject of the invention is a process for manufacturing a heavy-duty vehicle tire comprising the preparation of a rubber composition for tires based on at least a synthetic polyisoprene as predominant elastomer, a reinforcing filler of siliceous type, a chemical crosslinker and a modifier, characterized in that it comprises the following steps:
- incorporating into the diene elastomer, in the course of mixing, the modifier and subsequently the reinforcing filler, said modifier comprising at least one group Q, and at least one group A, which are joined to one another by at least one and preferably one "spacer" group Sp, in which:
  - Q comprises a dipole containing at least one and preferably one nitrogen atom,
  - A comprises an associative group comprising at least one nitrogen atom,
  - Sp is an atom or group of atoms forming a bond between Q and A,
  by thermomechanically kneading everything, in one or more steps, until a maximum temperature of between 110° C. and 200° C. is reached,
- cooling the combined mixture to a temperature of less than 100° C.,
- then incorporating the chemical crosslinker,
- kneading everything up to a maximum temperature of less than 120° C.,
- extruding or calendering the resulting rubber composition in order to form the tread,
- assembling the various semi-finished elements that make up the tire, including the tread formed above.

DETAILED DESCRIPTION OF SPECIFIC EMBODIMENTS

Thus, a first subject of the invention is a heavy-duty vehicle tire, the tread of which comprises a composition based on at least a synthetic polyisoprene as predominant elastomer, a reinforcing filler of siliceous type, a chemical crosslinker and a modifier comprising at least one group Q, and at least one group A, which are joined to one another by at least one and preferably one "spacer" group Sp as defined above.

The first component of the rubber composition according to an embodiment of the invention is the synthetic polyisoprene as predominant elastomer.

The synthetic polyisoprene may have any microstructure, which depends on the polymerization conditions used, in particular on the presence or absence of a modifier and/or randomizer and on the amounts of modifier and/or randomizer employed. Preferably, the synthetic polyisoprene has a high proportion of cis-1,4-units, namely a proportion of greater than 90 mol %, more preferably still a proportion of greater than 95 mol %. The synthetic polyisoprene may be prepared in dispersion, in emulsion or in solution; it may be coupled and/or star-branched or else functionalized with a coupling and/or star-branching or functionalizing agent.

The rubber composition according to an embodiment of the invention is based on at least one synthetic polysoprene and on at least one modifier. The synthetic polyisoprene may be grafted with the modifier prior to the polyisoprene being brought into contact with the other constituents of the rubber composition, or else it may be grafted by reaction with the modifier after being brought into contact with the various constituents of the composition, and therefore in the presence thereof, during the preparation of said composition.

The composition of the tread of the heavy-duty vehicle tire according to an embodiment of the invention may contain a synthetic polyisoprene grafted with the modifier (either grafted beforehand, or grafted by reaction with the modifier during the preparation of the composition), or a mixture of several grafted synthetic polyisoprenes.

According to one variant of the invention, the composition of the tread of the heavy-duty vehicle tire according to the invention comprises a grafted synthetic polyisoprene as sole elastomer. This variant constitutes a preferential variant according to the invention.

According to another variant of the invention, the composition of the tread of the heavy-duty vehicle tire according to the invention may contain, besides the grafted synthetic polyisoprene, one or more other diene elastomers which may or may not be grafted with the modifier according to the invention.

The other diene elastomer(s) used as a blend with the grafted elastomer according to the invention are conventional diene elastomers in the tire field, such as the diene elastomers selected from polybutadienes (BR), synthetic polyisoprenes (IR), natural rubber (NR), butadiene copolymers, isoprene copolymers and mixtures of these elastomers. Such copolymers are more preferably selected from butadiene-styrene copolymers (SBR), isoprene-butadiene copolymers (BIR), isoprene-styrene copolymers (SIR), isoprene-butadiene-styrene copolymers (SBIR) and mixtures of such copolymers.

According to this other variant, these conventional diene elastomers are then present in the rubber composition of the tread of the heavy-duty vehicle tire according to the invention in a proportion of between 0 and 60 phr (the limits of this range being excluded), preferably in a proportion ranging from more than 0 to 50 phr, more preferably still from more than 0 to 30 phr.

In the case of a blend with at least one other diene elastomer, the mass fraction of grafted synthetic polyisoprene according to an embodiment of the invention in the elastomer matrix is predominant and is preferably greater than or equal to 50% by weight of the total weight of the matrix. The predominant mass fraction according to the invention is the highest mass fraction in the blend. Thus, in an IR/elastomer A/elastomer B blend, the mass fractions may be distributed 40/40/20 or 40/30/30, the predominant mass fractions being respectively 40. And in an IR/elastomer blend, the mass fractions may be distributed 50/50 or 70/30, the predominant mass fractions being respectively 50 or 70.

It will be noted that the lower the proportion of said conventional diene elastomer(s) in the rubber composition, the greater the improvement in the properties of the rubber composition of the tread of the heavy-duty vehicle tire according to the invention.

The grafted synthetic polyisoprene(s) according to an embodiment of the invention may be used in combination with any type of synthetic elastomer other than a diene elastomer, or even with polymers other than elastomers, for example thermoplastic polymers.

A second component of the rubber composition according to an embodiment of the invention is the modifier. This modifier comprises at least one group Q, and at least one group A, which are joined to one another by at least one and preferably one "spacer" group Sp, in which:

Q comprises a dipole containing at least one and preferably one nitrogen atom,

A comprises an associative group comprising at least one nitrogen atom,

Sp is an atom or group of atoms forming a bond between Q and A.

A dipole is a function capable of forming a dipolar [1,3] addition to an unsaturated carbon-carbon bond.

An "associative group" is any of the groups capable of associating with one another via hydrogen bonds, ionic bonds and/or hydrophobic bonds. According to one preferred embodiment of the invention, the term refers to groups capable of undergoing association via hydrogen bonds.

When the associative groups are capable of undergoing association via hydrogen bonds, each associative group comprises at least one donor "site" and one acceptor site for the hydrogen bond, such that two identical associative groups are self-complementary and are able to associate with one another to form at least two hydrogen bonds.

The associative groups according to the invention are also capable of undergoing association via hydrogen bonds, ionic bonds and/or hydrophobic bonds with functions present on fillers.

The compounds according to an embodiment of the invention comprising a group Q, a "spacer" group and an associative group may be represented for example by the formula (Ia) below:

A-Sp-Q (Ia).

The compounds according to an embodiment of the invention comprising a group Q, a "spacer" group and two associative groups may be represented for example by the formula (Ib) below:

Similarly, the compounds according to an embodiment of the invention comprising two groups Q, a "spacer" group and an associative group may be represented for example by the formula (Ic) below:

According to the same principle, the compounds according to an embodiment of the invention comprising two groups Q, a "spacer" group and two associative groups may be represented for example by the formula (Id) below:

$$Q-\underset{A}{\overset{Q}{\underset{|}{Sp}}}-A. \quad (Id)$$

Preferably, the associative group is selected from an imidazolidinyl, ureyl, bisureyl, ureidopyrimidyl, triazolyl or triazinyl group.

Preferably, the group A corresponds to one of the formulae (II) to (VI) below:

(II)

(III)

(IV)

(V)

-continued

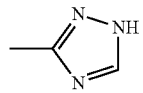
(VI)

where:
R denotes a hydrocarbon group that may optionally contain heteroatoms,
X denotes an oxygen or sulphur atom, preferably an oxygen atom.

Preferably, the group A comprises a 5- or 6-atom heterocycle with two or three nitrogens, preferably two nitrogens, which comprises at least one carbonyl function.

More preferably still, the group A comprises an imidazolidinyl group of formula (II).

The group Q is capable of bonding to the diene elastomer chain by covalent bonding (grafting). Preferably, the group Q comprises a nitrile oxide, nitrone or nitrile imine function which is able to bond to a polymer bearing at least one unsaturated group, by a [3+2] cycloaddition.

Preferably, the group Q is a group of formula (VII), (VIII) or (IX) below:

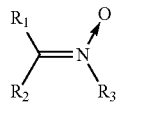
(VII)

(VIII)

(IX)

in which:
$R_1$ to $R_3$ are selected independently from a spacer group Sp, a hydrogen atom, a linear or branched $C_1$-$C_{20}$ alkyl group, a linear or branched $C_3$-$C_{20}$ cycloalkyl group, a linear or branched $C_6$-$C_{20}$ aryl group and a group of formula (X):

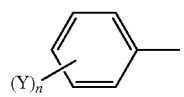
(X)

in which n represents 1, 2, 3, 4 or 5 and each Y represents independently a spacer group Sp, an alkyl group or a halide, one at least of $R_1$ to $R_3$ denoting a spacer group Sp or a group of formula (X) in which at least one Y denotes a spacer group Sp, $R_4$ to $R_5$ are spacer groups Sp, $R_6$ denotes a hydrogen atom, a linear or branched $C_1$-$C_{20}$ alkyl group, a linear or branched $C_3$-$C_{20}$ cycloalkyl group, a linear or branched $C_6$-$C_{20}$ aryl group and a group of formula (X):

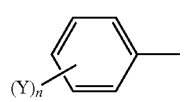
(X)

in which n represents 1, 2, 3, 4 or 5 and each Y represents independently an alkyl group or a halide.

The "spacer" group Sp allows the joining of at least one group Q and/or at least one associative group, A, and may therefore be of any type known per se. The "spacer" group, however, must not interfere or must interfere little with the Q and associative groups of the compound according to the invention.

Said "spacer" group is therefore considered to be a group which is inert towards the group Q. The "spacer" group is preferably a linear, branched or cyclic hydrocarbon chain which may contain one or more aromatic radicals and/or one or more heteroatoms. Said chain may optionally be substituted, provided that the substituents are inert towards groups Q.

According to one preferred embodiment, the "spacer" group is a $C_1$-$C_{24}$, preferably $C_1$-$C_{10}$, linear or branched alkyl chain, and more preferably a $C_1$-$C_6$ linear alkyl chain, optionally comprising one or more heteroatoms selected from nitrogen, sulphur, silicon or oxygen atoms.

According to one embodiment of the invention, the group Q is preferably a group of formula (XIa) or (XIb):

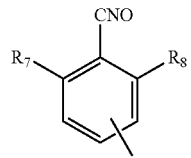
(XIa)

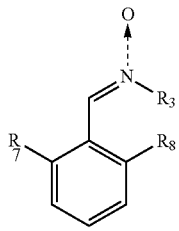
(XIb)

in which $R_7$ and $R_8$ represent independently a hydrogen or a $C_1$-$C_5$ alkyl group, an alkoxy or a halide, and preferably $R_7$ and $R_8$ represent independently an alkyl group or a halide, and more preferably $R_7$ and $R_8$ represent independently a methyl group or a chlorine atom, $R_3$ is as defined above, and the group A is a group of formula (XII):

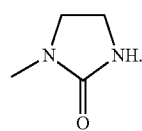
(XII)

Preferably, the compound intended for grafting the polymer in accordance with an embodiment of the invention is then selected from the compounds of formulae (XIII) to (XXI) below:

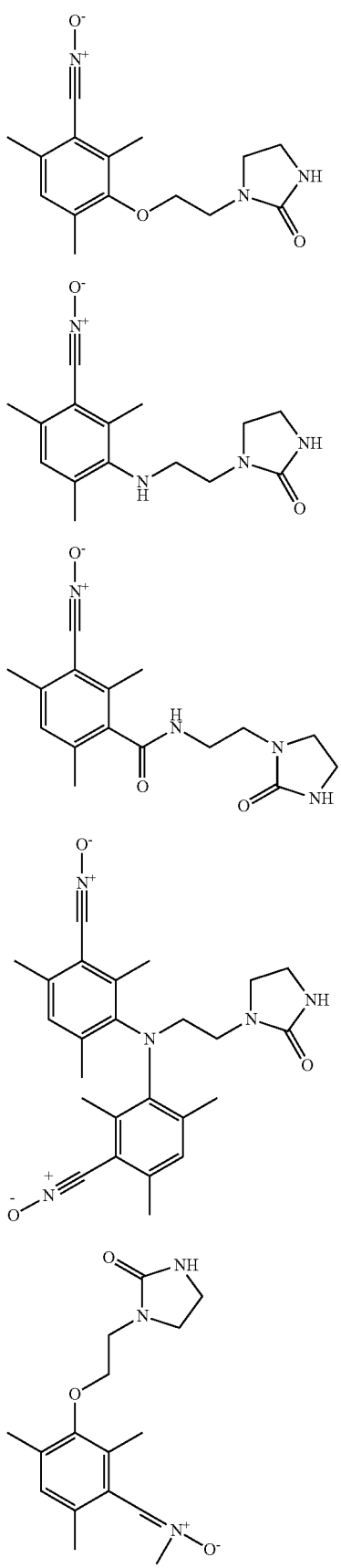

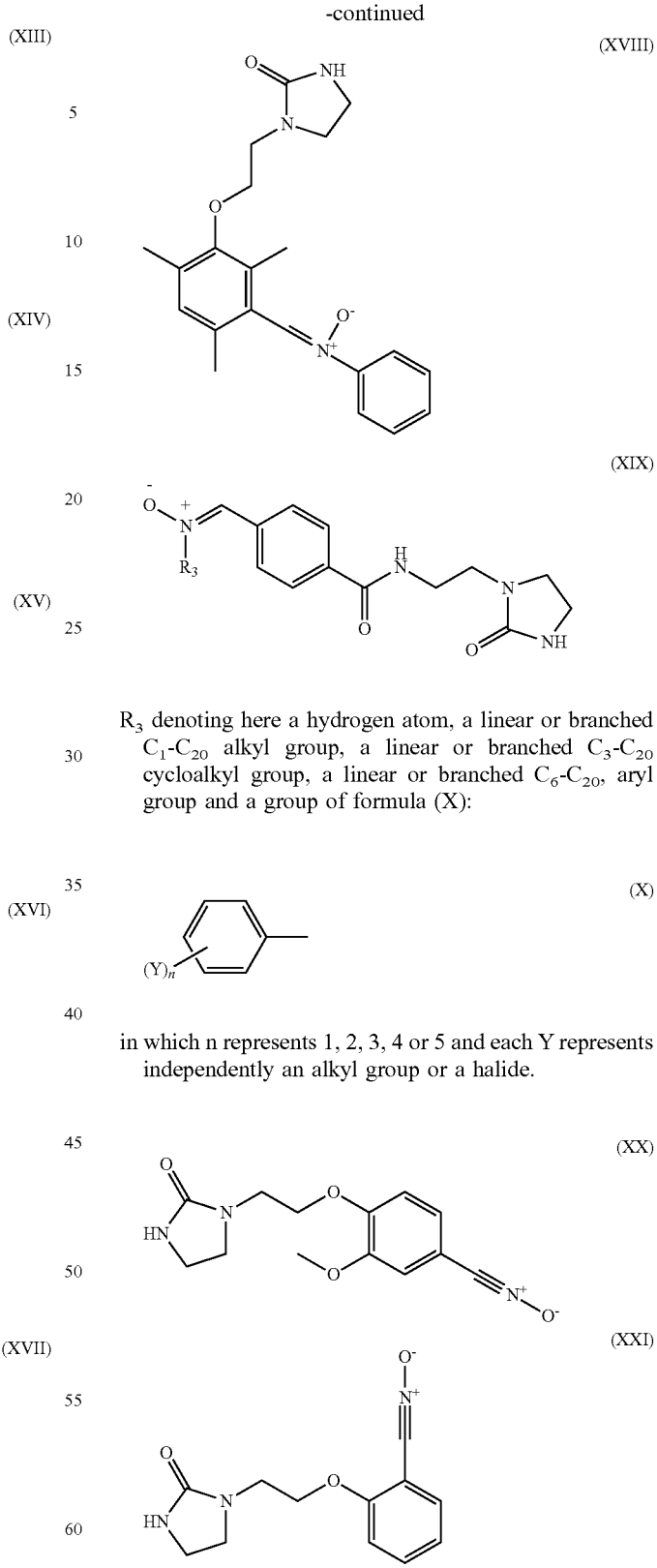

$R_3$ denoting here a hydrogen atom, a linear or branched $C_1$-$C_{20}$ alkyl group, a linear or branched $C_3$-$C_{20}$ cycloalkyl group, a linear or branched $C_6$-$C_{20}$, aryl group and a group of formula (X):

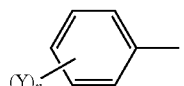

in which n represents 1, 2, 3, 4 or 5 and each Y represents independently an alkyl group or a halide.

According to another embodiment of the invention, the compound intended for grafting the polymer in accordance with the invention is selected from the compounds of formulae (XXII) and (XIII).

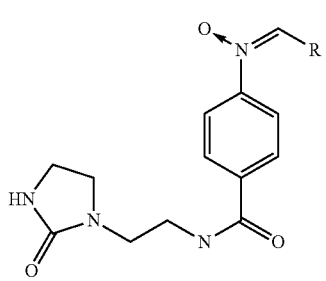

(XXII)

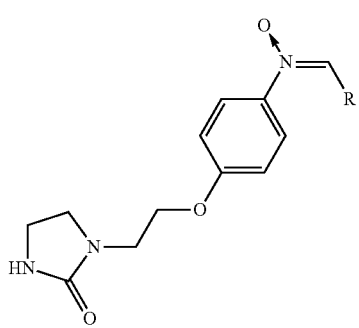

(XXIII)

in which R is selected from a spacer group Sp, a hydrogen atom, a linear or branched $C_1$-$C_{20}$ alkyl group, a linear or branched $C_3$-$C_{20}$ cycloalkyl group, a linear or branched $C_6$-$C_{20}$, aryl group and a group of formula (X):

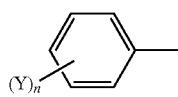

(X)

in which n represents 1, 2, 3, 4 or 5 and each Y represents independently a spacer group Sp, an alkyl group or a halide.

According to one preferred embodiment, the proportion of modifier varies from 0.01 mol % to 50 mol %, preferably from 0.01 mol % to 5 mol %.

Another component of the composition included in the tread of the tire according to an embodiment of the invention is the siliceous reinforcing inorganic filler.

According to another embodiment of the invention, the reinforcing filler exclusively consists of a reinforcing inorganic filler of siliceous type.

According to another embodiment, the reinforcing filler also comprises, besides the siliceous inorganic filler, carbon black. According to this other embodiment, when the carbon black is also present, it is preferably used in a proportion of less than 20 phr, more preferably less than 10 phr (for example between 0.5 and 20 phr, in particular between 2 and 10 phr). Within the intervals indicated, the colouring properties (black pigmenting agent) and UV resistant properties of the carbon blacks are benefited from.

Preferably, the proportion of reinforcing filler in the composition is between 30 and 150 phr, more preferably between 50 and 120 phr. The optimum is different depending on the particular applications targeted.

All carbon blacks, used individually or in the form of mixtures, especially the blacks conventionally used in tires or the treads thereof ("tire-grade" blacks), are suitable as carbon blacks. Mention will more particularly be made, among the latter, of the reinforcing carbon blacks of the 100, 200 or 300 series or the blacks of the 500, 600 or 700 series (ASTM grades), such as, for example, the N115, N134, N234, N326, N330, N339, N347, N375, N550, N683 and N772 blacks. These carbon blacks may be used in the isolated state, as available commercially, or in any other form, for example as a support for some of the rubber additives used.

Silica ($SiO_2$) is preferably suitable as siliceous reinforcing inorganic filler. The silica used may be any reinforcing silica known to a person skilled in the art, in particular any precipitated or fumed silica having a BET surface area and also a CTAB specific surface area both of less than 450 $m^2/g$, preferably from 30 to 400 $m^2/g$, in particular between 60 and 300 $m^2/g$. According to one aspect of the invention, it is possible to envisage replacing all or some of the siliceous reinforcing inorganic filler with an aluminous reinforcing inorganic filler, in particular alumina ($Al_2O_3$) or aluminium (oxide)hydroxides, or else reinforcing titanium oxides, for example described in U.S. Pat. Nos. 6,610,261 and 6,747,087.

The physical state in which the siliceous reinforcing inorganic filler is provided is not important, whether it is in the form of a powder, of microbeads, of granules, of beads or in any other appropriate densified form.

Use is made, in a known manner, in order to couple the siliceous reinforcing inorganic filler to the synthetic polyisoprene, of an at least bifunctional coupling agent (or bonding agent) intended to provide a satisfactory connection, of chemical and/or physical nature, between the siliceous inorganic filler (surface of its particles) and the polyisoprene, in particular of bifunctional organosilanes or polyorganosiloxanes.

Use is made in particular, in a known manner, of silane polysulphides, referred to as "symmetrical" or "asymmetrical" depending on their specific structure, as described, for example, in Applications WO 03/002648 and WO 03/002649.

In the rubber composition included in the tread of the tire according to an embodiment of the invention, the content of coupling agent is preferably between 3 and 15 phr, more preferably between 4 and 8 phr. The proportion thereof is easily adjusted by a person skilled in the art depending on the proportion of siliceous filler; it is typically of the order of 0.5% to 15% by weight relative to the amount of siliceous filler.

The rubber composition included in the tread of the tire according to an embodiment of the invention may also contain, in addition to the coupling agents, coupling activators, agents for covering the fillers or more generally processing aids capable, in a known manner, by virtue of an improvement in the dispersion of the filler in the rubber matrix and of a lowering of the viscosity of the compositions, of improving their ability to be processed in the uncured state, these agents being, for example, hydrolysable silanes, such as alkylalkoxysilanes, polyols, polyethers, primary, secondary or tertiary amines, or hydroxylated or hydrolysable polyorganosiloxanes.

A person skilled in the art will understand that, as filler equivalent to the siliceous reinforcing inorganic filler described above, use might be made of a reinforcing filler of another nature, provided that this reinforcing filler is covered with an inorganic layer, such as silica, or else comprises functional sites, in particular hydroxyl sites, at its surface, which requires the use of a coupling agent in order to form the bond between the filler and the elastomer.

The rubber composition included in the tread of the tire according to an embodiment of the invention may also contain reinforcing organic fillers that may replace all or some of the carbon black or reinforcing inorganic fillers other than the siliceous ones described above. As examples of reinforcing organic fillers, mention may be made of the functionalized polyvinyl organic fillers as described in Applications WO-A-2006/069792, WO-A-2006/069793, WO-A-2008/003434 and WO-A-2008/003435.

Another component of the rubber composition of the tread of the tire according to an embodiment of the invention is the chemical crosslinker.

Chemical crosslinking enables the formation of covalent bonds between the elastomer chains. Chemical crosslinking may be carried out by means of a vulcanization system or else by means of peroxide compounds.

The actual vulcanization system is based on sulphur (or on a sulphur donor) and on a primary vulcanization accelerator. Added to this base vulcanization system, are various known secondary vulcanization accelerators or vulcanization activators, such as zinc oxide, stearic acid or equivalent compounds, or guanidine derivatives (in particular diphenylguanidine), which are incorporated during the first non-productive phase and/or during the productive phase as described below.

Sulphur is used in a preferential proportion of between 0.5 and 12 phr, in particular between 1 and 10 phr. The primary vulcanization accelerator is used in a preferential proportion of between 0.5 and 10 phr, more preferably between 0.5 and 5.0 phr.

Use may be made, as (primary or secondary) accelerator, of any compound capable of acting as accelerator of the vulcanization of the diene elastomers in the presence of sulphur, in particular accelerators of the thiazole type and derivatives thereof and accelerators of the thiuram and zinc dithiocarbamate types. Preferably, use is made of a primary accelerator of the sulphenamide type.

When the chemical crosslinking is carried out by means of one or more peroxide compounds, said peroxide compound(s) represent(s) from 0.01 to 10 phr.

As peroxide compounds that can be used as a chemical crosslinking system, mention may be made of acyl peroxides, for example benzoyl peroxide or p-chlorobenzoyl peroxide, ketone peroxides, for example methyl ethyl ketone peroxide, peroxyesters, for example t-butyl peroxyacetate, t-butyl peroxybenzoate and t-butyl peroxyphthalate, alkyl peroxides, for example dicumyl peroxide, di-t-butyl peroxybenzoate and 1,3-bis(t-butyl peroxyisopropyl)benzene, hydroperoxides, for example t-butyl hydroperoxide.

The rubber composition of the tread of the tire according to an embodiment of the invention may also comprise all or some of the standard additives customarily used in the compositions of elastomers intended for the manufacture of heavy-duty vehicle tires, in particular treads, such as for example pigments, protective agents such as anti-ozone waxes (such as the C32 ST ozone wax), chemical antiozonants, antioxidants (such as 6-paraphenylenediamine), anti-fatigue agents, reinforcing resins, methylene acceptors (for example phenol-novolac resin) or methylene donors (for example HMT or H3M) as described for example in Application WO 02/10269, or adhesion promoters (cobalt salts for example).

According to one variant of the invention, the rubber composition of the tread for a heavy-duty vehicle tire according to the invention comprises plasticizers or extender oils, whether the latter are of aromatic or non-aromatic nature, which are preferably present in a proportion of less than 10 phr. Use is then made, as preferred non-aromatic or very weakly aromatic plasticizing agent, of at least one compound selected from the group consisting of naphthenic oils, paraffinic oils, MES oils, TDAE oils, glycerol esters (in particular trioleates), plasticizing hydrocarbon resins having a high Tg preferably greater than 30° C., and mixtures of such compounds. According to another variant, the rubber composition does not comprise plasticizer or extender oil.

Another subject of the invention is the process for manufacturing the heavy-duty vehicle tire according to embodiments of the invention, comprising the steps of preparing the rubber composition included in the tread thereof.

The rubber composition is manufactured in appropriate mixers, using two successive preparation phases according to a general procedure that is well known to a person skilled in the art. A first phase of thermomechanical working or kneading (sometimes referred to as "non-productive" phase) is carried out at high temperature, up to a maximum temperature of between 130° C. and 200° C., preferably between 145° C. and 185° C. The total kneading time, in this first phase, is preferably between 1 and 15 min. After cooling the mixture thus obtained during the first, non-productive, phase, the chemical crosslinking system is then incorporated at low temperature, generally in an external mixer such as an open mill; everything is then mixed (productive phase) for a few minutes, for example between 2 and 15 min. This second phase of mechanical working (sometimes referred to as "productive" phase) is carried out at lower temperature, typically below 120° C., for example between 60° C. and 100° C.

Generally, all the base constituents of the rubber composition of the tread of the tire of an embodiment of the invention, with the exception of the chemical crosslinking system, namely the reinforcing filler(s), and the coupling agent where appropriate, are incorporated intimately, by kneading, into the diene elastomer or diene elastomers during the first, non-productive, phase, that is to say that at least these various base constituents are introduced into the mixer and are thermomechanically kneaded, in one or more steps, until the maximum temperature of between 130° C. and 200° C., preferably of between 145° C. and 185° C., is reached.

According to a first embodiment of the invention, the synthetic polyisoprene has been grafted with the modifier prior to the first, non-productive, phase of the preparation of the rubber composition. Thus, in this case, it is the grafted polyisoprene which is introduced during the first, non-productive, phase. Thus, according to this first embodiment of the process, the process comprises the following steps:

modifying the synthetic polyisoprene in post-polymerization or in solution or in bulk by grafting a modifier comprising at least one group Q, and at least one group A, which are joined to one another by at least one and preferably one "spacer" group Sp as described above, incorporating the reinforcing filler and all of the base constituents of the composition, with the exception of the chemical crosslinking system, into the synthetic polyisoprene thus grafted with the modifier, by thermomechanically kneading everything, in one or more steps, until a maximum temperature of between 130° C. and 200° C., preferably between 145° C. and 185° C., is reached, cooling the combined mixture to a temperature of less than 100° C., then incorporating the chemical crosslinker, kneading everything up to a maximum temperature of less than 120° C., extruding the resulting rubber composition in order to form the tread, assembling the various semi-finished elements that make up the tire, including the tread formed above.

According to a second embodiment of the invention, the grafting of the synthetic polyisoprene with the modifier is carried out simultaneously with the preparation of the rubber composition. In this case, both the as yet ungrafted synthetic polyisoprene and the modifier are introduced during the first, non-productive, phase. Preferably, the reinforcing filler is then added subsequently, during this same non-productive phase, in order to prevent any unwanted reaction with the modifier.

Thus, according to this second embodiment of the process, the process comprises the following steps:
incorporating into the polyisoprene a modifier comprising at least one group Q, and at least one group A, which are joined to one another by at least one and preferably one "spacer" group Sp, as described above, at a temperature and for a time such that the grafting efficiency is preferably greater than 60%, more preferably greater than 80%, and, preferably subsequently, the reinforcing filler, and also all the base constituents of the composition, with the exception of the chemical crosslinking system, by thermomechanically kneading everything, in one or more steps, until a maximum temperature of between 130° C. and 200° C., preferably between 145° C. and 185° C., is reached,
cooling the combined mixture to a temperature of less than 100° C.,
then incorporating the chemical crosslinker,
kneading everything up to a maximum temperature of less than 120° C.,
extruding the resulting rubber composition in order to form the tread,
assembling the various semi-finished elements that make up the tire, including the tread formed above.

A person skilled in the art will understand that when the rubber composition comprises ungrafted conventional diene elastomers such as described above, the heavy-duty vehicle tire according to an embodiment of the invention is preferably manufactured according to the first embodiment of the tire manufacturing process in order to prevent any unwanted reaction between these other conventional elastomers and the modifier.

The grafting of the synthetic polyisoprene takes place by reaction of said elastomer with the reactive group or groups borne by the modifier. During this reaction, this reactive group or these reactive groups form covalent bonds with the polyisoprene chain.

The grafting of the modifier may be carried out in bulk, for example in an internal mixer or an external mixer such as an open mill. Grafting is then performed either at a temperature of the external mixer or of the internal mixer of less than 60° C., followed by a grafting reaction step in a press or in an oven at temperatures ranging from 80° C. to 200° C., or at a temperature of the external mixer or of the internal mixer of greater than 60° C., without subsequent heat treatment.

The process of grafting may also be carried out in solution, continuously or batchwise. The polyisoprene thus modified may be separated from its solution by any means known to a person skilled in the art and in particular by a steam stripping operation.

The grafting of the modifier is carried out by [3+2] cycloaddition of the reactive group or groups of the modifier and one or more double bonds in the polyisoprene chain. The mechanism of the cycloaddition may be illustrated by the following equations:

Cycloaddition of a nitrile oxide to an unsaturated group or double bond of the polyisoprene

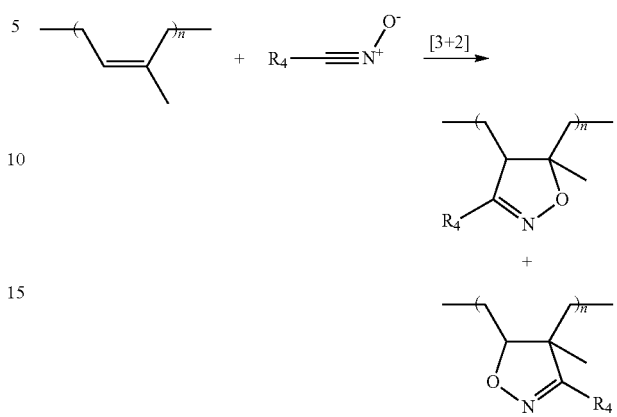

Cycloaddition of a nitrone to an unsaturated group or double bond of the polysisoprene

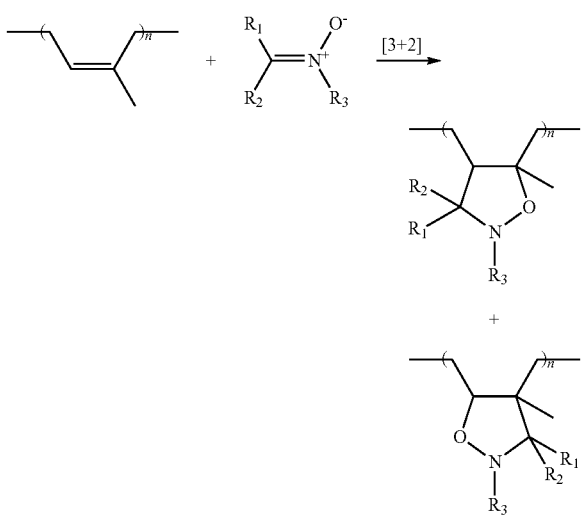

Cycloaddition of a nitrile imine to an unsaturated group or double bond of the polysisoprene

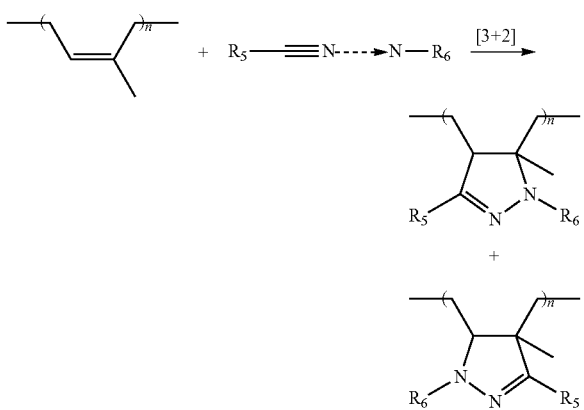

The invention and the advantages thereof will be readily understood in light of the following exemplary embodiments.

Exemplary Embodiments

I. Measurements and Tests Used

The elastomers and rubber compositions are characterized, before and after curing, as indicated below.

Determination of the Proportion of Modifier

The molar proportion of grafted nitrile oxide compound is determined by NMR analysis. The spectra are acquired on a Bruker 500 MHz spectrometer equipped with a 5 mm BBIz-grade "broadband" probe. The quantitative $^1$H NMR experiment uses a single 30° pulse sequence and a repetition time of 3 seconds between each acquisition. The samples are dissolved in carbon disulphide ($CS_2$). 100 µl of deuterated cyclohexane ($C_6D_{12}$) are added for the lock signal.

The $^1$H NMR spectrum makes it possible to quantify the grafted nitrile oxide units by integration of the characteristic signals for the $CH_2N$ and $CH_2O$ protons, which appear at a chemical shift of between δ=3.1-3.8 ppm.

The 2D $^1$H—$^{13}$C HSQC NMR spectrum makes it possible to verify the nature of the grafted unit by virtue of the chemical shifts of the carbon atoms and proton.

Glass Transition Temperature

The glass transition temperatures, Tg, of the polymers are measured using a differential scanning calorimeter. The analysis is performed in accordance with the requirements of standard ASTM D3418-08.

Near-Infrared (NIR) Spectroscopy

Near-infrared (NIR) spectroscopy is used to quantitatively determine the proportion by mass of styrene in the elastomer and also its microstructure (relative distribution of the 1,2-vinyl, trans-1,4 and cis-1,4 butadiene units). The principle of the method is based on the Beer-Lambert law, generalized to a multi-component system. As the method is indirect, it employs a multivariate calibration [Vilmin, F.; Dussap, C.; Coste, N. Applied Spectroscopy 2006, 60, 619-29] carried out using standard elastomers having a composition determined by $^{13}$C NMR. The proportion of styrene and the microstructure are then calculated from the NIR spectrum of an elastomer film with a thickness of approximately 730 µm. The spectrum is acquired in transmission mode between 4000 and 6200 cm$^{-1}$ with a resolution of 2 cm$^{-1}$, using a Bruker Tensor 37 Fourier-transform near-infrared spectrometer equipped with a Peltier-cooled InGaAs detector.

Size-Exclusion Chromatography

Size-exclusion chromatography (SEC) is used. SEC enables macromolecules in solution to be separated according to their size, through columns filled with a porous gel. The macromolecules are separated according to their hydrodynamic volume, with the bulkiest being eluted first.

Although not an absolute method, SEC makes it possible to comprehend the distribution of the molar masses of a polymer. On the basis of commercial standard products, the different number-average (Mn) and weight-average (Mw) molar masses can be determined and the polydispersity index (Ip=Mw/Mn) can be calculated via a Moore calibration.

Preparation of the Polymer: There is no special treatment of the polymer sample before analysis. It is simply dissolved, in (tetrahydrofuran+1 vol % of diisopropylamine+1 vol % of triethylamine+1 vol % of distilled water) or in chloroform, to a concentration of approximately 1 g/l. The solution is then filtered through a filter with a porosity of 0.45 µm before injection.

SEC Analysis: The apparatus used is a Water alliance chromatograph.

The elution solvent is tetrahydrofuran+1 vol % of diisopropylamine+1 vol % of triethylamine, or chloroform, depending on the solvent used for dissolving the polymer. The flow rate is 0.7 ml/min, the temperature of the system is 35° C. and the analysis time is 90 minutes. A set of four Waters columns in series is used, with tradenames Styragel HMW7, Styragel HMW6E and two Styragel HT6E.

The volume of the polymer sample solution injected is 100 µl. The detector is a Waters 2410 differential refractometer, and the software for analyzing the chromatographic data is the Waters Empower system.

The calculated average molar masses relate to a calibration curve produced from commercial PSS Ready CAL-KIT polystyrene standards.

Tensile Tests

These tensile tests make it possible to determine the elasticity stresses and the properties at break. Unless indicated otherwise, they are carried out in accordance with French standard NF T 46-002 of September 1988. Processing the tensile recordings also makes it possible to plot the curve of modulus as a function of elongation. The modulus used here being the nominal (or apparent) secant modulus measured in first elongation, calculated relative to the initial cross section of the test specimen. The nominal secant moduli (or apparent stresses in MPa) are measured in first elongation at 100% and 300% elongation, identified respectively as ASM100 and ASM300.

The tensile strengths (in MPa) and the elongations at break (in %) are measured at 23° C.±2° C. and at 100° C.±2° C., in accordance with standard NF T 46-002.

Dynamic Properties

The dynamic properties ΔG* and tan(δ)max are measured on a viscosity analyzer (Metravib VA4000), in accordance with standard ASTM D 5992-96. A recording is made of the response of a sample of vulcanized composition (cylindrical test specimen with a thickness of 4 mm and a cross section of 400 mm$^2$), which is subjected to a simple alternating sinusoidal shear stress, at a frequency of 10 Hz, under standard temperature conditions (23° C.) in accordance with standard ASTM D 1349-99, or, where appropriate, at a different temperature (60° C.). A strain amplitude sweep is carried out from 0.1% to 100% (outward cycle) and then from 100% to 0.1% (return cycle). The results utilized are the complex dynamic shear modulus (G*) and the loss factor tan(δ). For the return cycle, the maximum value of tan(δ) observed, identified as tan(δ)max, and also the difference in complex modulus (ΔG*) between the values at 0.1% and at 100% strain (Payne effect) are indicated.

II. Examples of Compositions

II-1. Preparation of the 2,4,6-trimethyl-3-(2-(2-oxoimidazolidin-1-yl)ethoxy)nitrile oxide modifier The modifier is prepared according to the method described in Application WO 2012/007441.

II-2. Preparation of the Compositions

The procedure for the tests below is as follows: the non-grafted diene elastomer or elastomers are introduced into an 85 cm$^3$ Polylab internal mixer, which is filled to 70% and the initial vessel temperature of which is approximately 110° C. For the mixtures relating to the invention, the modifier is introduced at the same time as the diene elastomer and thermomechanical working is carried out for 1 min 30 s at 25° C., with everything being mixed (productive phase) for approximately 5 to 6 min.

Subsequently, for all of the compositions (controls and compositions of the invention), the optional reinforcing filler or fillers, the optional coupling agent and then, after one to two minutes of kneading, the various other ingredients, with the exception of the vulcanization system, are introduced into the mixer. Thermomechanical working (non-productive phase) is then carried out in one step (total kneading time equal to approximately 5 min), until a maximum "dropping" temperature of 160° C. is reached. The resulting mixture is recovered and cooled and then the vulcanization system (sulphur) is added on an external mixer (homo-finisher) at 25° C., with everything being mixed (productive phase) for approximately 5 to 6 min.

The resulting compositions are subsequently calendered in the form of either slabs (thickness of 2 to 3 mm) or thin sheets of rubber for the measurement of their physical or mechanical properties, or in the form of profiled elements which can be used directly, after cutting and/or assembling to the desired dimensions, for example as semi-finished products for tires, in particular as tire treads.

The rubber compositions are given in table 9. The amounts are expressed in parts per 100 parts by weight of elastomer (phr).

comprising a non-grafted polyisoprene. This reduction of the order of 34% is much greater than that observed for the comparative composition based on grafted natural rubber, which is only 8%.

It is observed that the rubber composition in accordance with the invention based on silicon and comprising a grafted polyisoprene has high ASM 100% and ASM 300% moduli while also very greatly lowering the hysteresis of the composition. The improvement in the compromise of properties is significant and unexpected in view of the properties observed with a composition based on grafted natural rubber.

III. Tire Tests

These significant results of increase of the ASM 100% and ASM 300% moduli and decrease of the hysteresis of a composition based on a grafted synthetic polyisoprene were confirmed during road tests on heavy-duty vehicle tires described below.

TABLE 9

|  |  | Control composition T1 | Composition according to the invention 1 | Control composition T2 | Comparative composition 2 |
|---|---|---|---|---|---|
|  | NR (1) |  |  | 100 | 100 |
|  | IR (2) | 100 | 100 |  |  |
|  | Carbon black (3) | 3 | 3 | 3 | 3 |
|  | Silica (4) | 50 | 50 | 50 | 50 |
|  | Silane (5) | 5 | 5 | 5 | 5 |
|  | Modifier (6) |  | 4.25 |  | 4.25 |
|  | ZnO (7) | 2.7 | 2.7 | 2.7 | 2.7 |
|  | SAD (8) | 2.5 | 2.5 | 2.5 | 2.5 |
|  | Antioxidant (9) | 1.5 | 1.5 | 1.5 | 1.5 |
|  | Antioxidant (10) | 1 | 1 | 1 | 1 |
|  | Plasticizer (11) | 1 | 1 | 1 | 1 |
|  | Accelerator (12) | 1.8 | 1.8 | 1.8 | 1.8 |
|  | Sulphur | 1.5 | 1.5 | 1.5 | 1.5 |
| Tensile prop. 60° C. | Elongation at break (%) | 590.70 | 521.85 | 666.30 | 582.20 |
|  | Tensile strength (MPa) | 25.12 | 25.00 | 26.12 | 23.42 |
|  | ASM100 | 1.93 | 2.24 | 1.75 | 2.06 |
|  | ASM300 | 2.99 | 3.97 | 2.68 | 3.42 |
|  | ASM300/ASM100 | 1.55 | 1.77 | 1.53 | 1.66 |
| Dynamic prop 60° C. | $G^*_{(50\%)}$ MPa | 1.50 | 1.29 | 1.38 | 1.33 |
|  | $\Delta G^*_{(100\%-2.1\%)}$ (MPa) | 2.13 | 0.46 | 1.44 | 0.82 |
|  | Tan($\delta$)max | 0.133 | 0.087 (−34%) | 0.114 | 0.105 (−8%) |

(1) Deprotonated natural rubber
(2) Synthetic polyisoprene with 95% of cis-1,4- units
(3) N234
(4) "Zeosil 1165 MP" silica from Rhodia in the form of microbeads (BET and CTAB: around 150-160 m$^2$/g)
(5) TESPT ("Si69" from Degussa);
(6) Modifier: 2,4,6-trimethyl-3-(2-(2-oxoimidazolidin-1-yl)ethoxy)nitrileoxide
(7) zinc oxide (industrial grade—Umicore)
(8) Stearin ("Pristerene 4931"—Uniqema)
(9) N-1,3-dimethylbutyl-N-phenyl-para-phenylenediamine ("Santoflex 6-PPD" from Flexsys)
(10) 2,2,4-trimethyl-1,2-dihydroquinoline (Flexsys)
(11) Paraffin
(12) N-cyclohexyl-2-benzothiazyl sulphenamide ("Santocure CBS" from Flexsys).

Characterization Tests—Results

The objective of this example is to compare the properties of a silica-based rubber composition according to the invention comprising a grafted synthetic polyisoprene elastomer (composition according to the invention) with a comparative composition comprising grafted natural rubber (comparative composition).

The composition according to the invention has, at 60° C., a great reduction in the Payne effect seen through the reduction in hysteresis (tan($\delta$)max) during strain sweep under applied stress compared to its control composition

|  | Control composition A | Composition according to the invention B |
|---|---|---|
| IR (1) | 100 | 100 |
| Carbon black (2) | 3 | 3 |
| Silica (3) | 50 | 55 |
| Silane (4) | 5 | 5.5 |
| Modifier (5) |  | 2.55 |
| ZnO (6) | 2.7 | 2.7 |
| SAD (7) | 2.5 | 2.5 |

-continued

|  | Control composition A | Composition according to the invention B |
|---|---|---|
| Antioxidant (8) | 1.5 | 1.5 |
| Antioxidant (9) | 1 | 1 |
| Plasticizer (10) | 1 | 1 |
| Accelerator (11) | 1.8 | 1.92 |
| Sulphur | 1.5 | 1.6 |
| Elongation at break (%) | 714.40 | 642.80 |
| Tensile strength (MPa) | 25.38 | 25.24 |
| ASM100 | 1.84 | 2.15 |
| ASM300 | 2.25 | 3.38 |
| ASM300/ASM100 | 1.22 | 1.57 |
| $G^*_{(50\%)}$ (MPa) | 1.45 | 1.35 |
| $\Delta G^*_{(100\%-0.1\%)}$ (MPa) | 2.58 | 0.42 |
| Tan($\delta$)max | 0.121 | 0.070 |

(1) Synthetic polyisoprene with 95% of cis-1,4-units
(2) N234
(3) "Zeosil 1165 MP" silica from Rhodia in the form of microbeads (BET and CTAB: around 150-160 m²/g)
(4) TESPT ("Si69" from Degussa);
(5) Modifier: 2,4,6-trimethyl-3-(2-(2-oxoimidazolidin-1-yl)ethoxy)nitrileoxide
(6) zinc oxide (industrial grade-Umicore)
(7) Stearin ("Pristerene 4931"-Uniqema)
(8) N-1,3-dimethylbutyl-N-phenyl-para-phenylenediamine ("Santoflex 6-PPD" from Flexsys)
(9) 2,2,4-trimethyl-1,2-dihydroquinoline (Flexsys)
(10) Paraffin
(11) N-cyclohexyl-2-benzothiazyl sulphenamide ("Santocure CBS" from Flexsys).

Two compositions A and B above were used to form the tread of radial carcass tires of dimension 315/70R22.5 XE2+. These tires are identical except for the composition constituting the respective treads thereof.

III-1—Description of the Tests

III-1.1—Rolling Resistance:

The rolling resistance is measured according to the standard ISO 9948 that applies to tires for vans and heavy-duty vehicles. The tire is run on a large-diameter flywheel, driven by a motor. The method consists in measuring the deceleration of the system in the vicinity of 80 km/h in order to deduce the rolling resistance therefrom.

The rolling resistance expressed relative to a base 100 of the control is expressed as the ratio of the rolling resistance force of the control tire consisting of composition A to the rolling resistance force of the tire consisting of composition B. The rolling resistance force is deduced from the overall braking force measured from which the retarding force of the free tire and the retarding force of the free flywheel are subtracted.

III. 1.2—Wear Resistance:

The wear tests were carried out on tires fitted to the front position of a lorry of tractor type. The wear rolling is carried out over a distance of 30 000 km. The wear performance expressed relative to a base 100 of the control is calculated by the ratio between the mean height loss measured for the two tires of the control composition A and the mean height loss for the two tires of composition B.

The results of the tires corresponding to the above formulations are indicated relative to a base 100 in the table below.

III-2—Results

The results obtained for the tire performances are presented in the following table. A value above 100 indicates an improved tire performance result.

|  | Control tire A | Tire according to the invention B |
|---|---|---|
| Rolling resistance | 100 | 112 |
| Wear | 100 | 112 |

The tires produced with composition B have not only a greatly improved rolling resistance compared to that of the control, but also a favourable wear performance.

The invention claimed is:

1. A heavy-duty vehicle tire comprising a tread consisting of a crosslinked rubber composition, wherein the crosslinked rubber composition is based at least on the following components:

an elastomer matrix consisting of greater than 50% by weight, based on the total weight of the matrix, of a synthetic polyisoprene, said synthetic polyisoprene having greater than 90 mol % of cis 1,4 units, and said elastomer matrix containing less than 30 phr of each of any diene elastomers other than said synthetic polyisoprene, between 30 and 150 phr of a filler, said filler consisting of a reinforcing inorganic filler consisting of silica ($SiO_2$) and less than 20 phr of carbon black, and a reinforcing inorganic filler/functionalized diene elastomer bonding agent, a chemical crosslinker, and a modifier selected from the compounds comprising at least one group Q, and at least one group A, which are joined to one another by at least one "spacer" group Sp, wherein:

Q comprises a nitrile oxide, nitrone or nitrile imine function,

A comprises an associative group comprising at least one nitrogen atom,

Sp is a $C_1$ to $C_{24}$ group forming a bond between Q and A.

2. The heavy-duty vehicle tire according to claim 1, wherein A is selected from the group consisting of imidazolidinyl, triazolyl, triazinyl, bisureyl, ureyl, and ureidopyrimidyl groups.

3. The heavy-duty vehicle tire according to claim 1, wherein the group A corresponds to one of the formulae (II) to (VI) below:

(II)

(III)

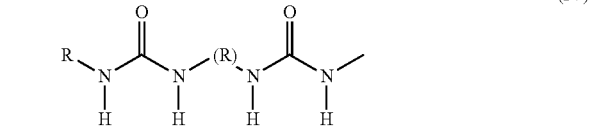

(IV)

-continued

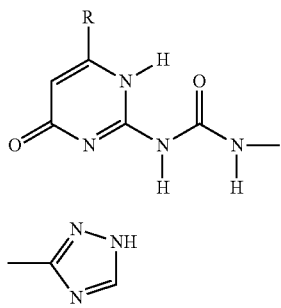
(V)

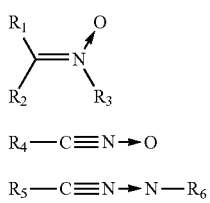
(VI)

where:
R denotes a hydrocarbon group,
X denotes an oxygen or sulphur atom.

4. The heavy-duty vehicle tire according to claim 1, wherein the group Q is a group of formula (VII), (VIII) or (IX) below:

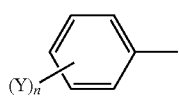
(VII)

$R_4-C\equiv N\rightarrow O$ (VIII)

$R_5-C\equiv N\rightarrow N-R_6$ (IX)

wherein
$R_1$ to $R_3$ are selected independently from the group consisting of a spacer group Sp, a hydrogen atom, a linear or branched $C_1$-$C_{20}$ alkyl group, a linear or branched $C_3$-$C_{20}$ cycloalkyl group, a linear or branched $C_6$-$C_{20}$ aryl group and a group of formula (X):

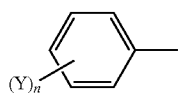
(X)

in which n represents 1, 2, 3, 4 or 5 and each Y represents independently a spacer group Sp, an alkyl group or a halide,
one at least of $R_1$ to $R_3$ denoting a spacer group Sp or a group of formula (X) in which at least one Y denotes a spacer group Sp,
$R_4$ to $R_5$ are spacer groups Sp,
$R_6$ denotes a hydrogen atom, a linear or branched $C_1$-$C_{20}$ alkyl group, a linear or branched $C_3$-$C_{20}$ cycloalkyl group, a linear or branched $C_6$-$C_{20}$ aryl group and a group of formula (X):

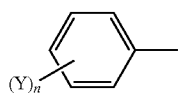
(X)

in which n represents 1, 2, 3, 4 or 5 and each Y represents independently an alkyl group or a halide.

5. The heavy-duty vehicle tire according to claim 1, wherein the group Q is a group of formula (XIa) or (XIb):

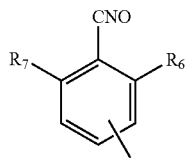
(XIa)

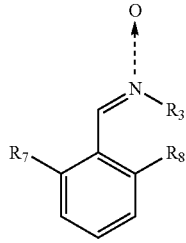
(XIb)

in which $R_7$ and $R_8$ represent independently a hydrogen or a $C_1$-$C_5$ alkyl group, an alkoxy or a halide, $R_3$ is a spacer group Sp, a hydrogen atom, a linear or branched $C_1$-$C_{20}$ alkyl group, a linear or branched $C_3$-$C_{20}$ cycloalkyl group, a linear or branched $C_6$-$C_{20}$ aryl group, or a group of formula (X):

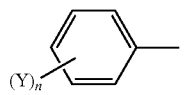
(X)

in which n represents 1, 2, 3, 4 or 5 and each Y represents independently a spacer group Sp, an alkyl group or a halide,
and the group A is a group of formula (XII):

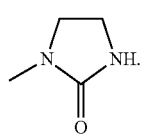
(XII)

6. The heavy-duty vehicle tire according to claim 1, wherein the modifier is selected from the compounds of formulae (XIII) to (XXI) below:

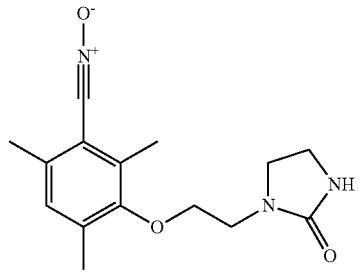
(XIII)

(XIV)
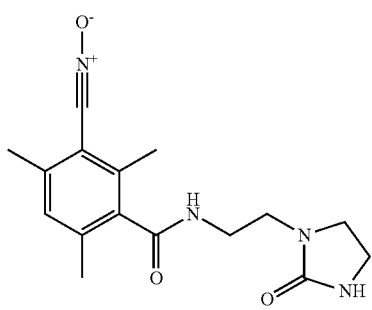

(XV)
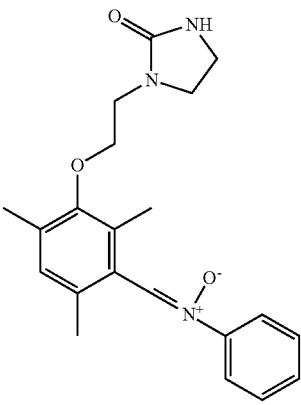

(XVI)
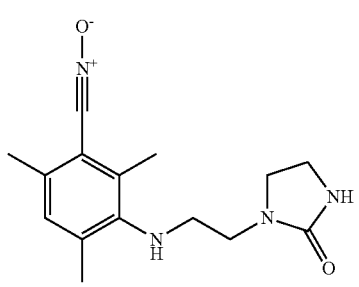

(XVIII)
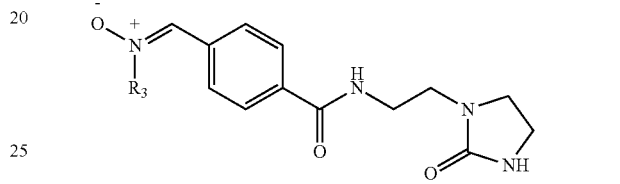

(XIX)

wherein $R_3$ denotes a hydrogen atom, a linear or branched $C_1$ to $C_{20}$ alkyl group, a linear or branched $C_3$ to $C_{20}$ cycloalkyl group, a linear or branched $C_6$ to $C_{20}$ aryl group and a group of formula (X):

(X)
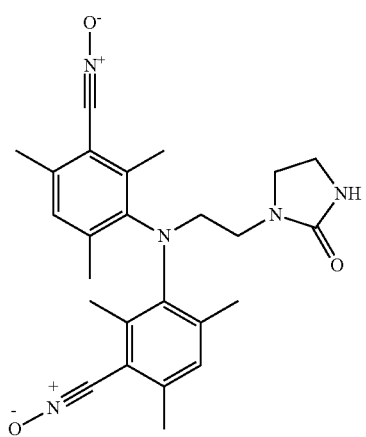

in which n represents 1, 2, 3, 4 or 5 and each Y represents independently an alkyl group or a halide (XVII)
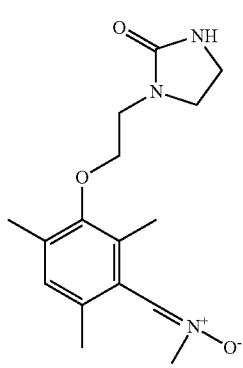

(XX)
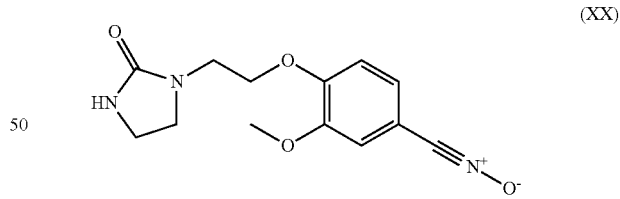

(XXI)
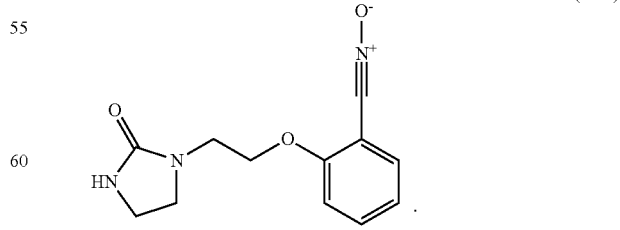

7. The heavy-duty vehicle tire according to claim 1, wherein the modifier is selected from the compounds of formulae (XXII) and (XXIII) below:

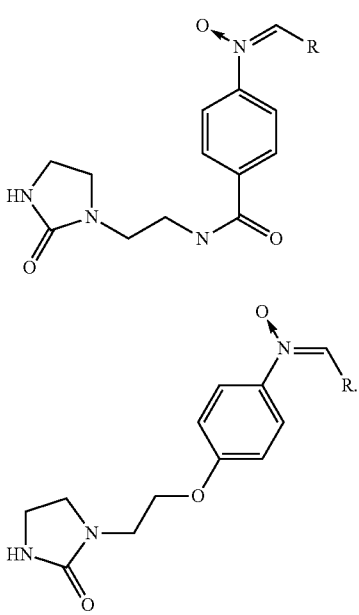

(XXII)

(XXIII)

8. The heavy-duty vehicle tire according to claim 1, wherein the rubber composition comprises at most 10 phr of a plasticizer.

9. The heavy-duty vehicle tire according to claim 1, wherein the elastomer matrix consists of the synthetic polyisoprene with the modifier grafted thereto as the sole elastomer.

10. The heavy-duty vehicle tire according to claim 1, wherein the elastomer matrix comprises at least one other grafted or ungrafted diene elastomer.

11. The heavy-duty vehicle tire according to claim 1, wherein the chemical crosslinker comprises 0.5 to 12 phr of sulphur, or 0.01 to 10 phr of one or more peroxide compounds.

12. The heavy-duty vehicle tire according to claim 1, wherein the proportion of modifier varies from 0.01 mol % to 50 mol %.

13. A process for manufacturing a heavy-duty vehicle tire comprising preparing the rubber composition of the tread, which comprises:
    modifying synthetic polyisoprene by grafting a modifier comprising at least one group Q, and at least one group A, which are joined to one another by at least one "spacer" group Sp, in which:

Q comprises a nitrile oxide, nitrone or nitrile imine function,
A comprises an associative group comprising at least one nitrogen atom,
Sp is a $C_1$ to $C_{24}$ group forming a bond between Q and A,
incorporating between 30 and 150 phr of a reinforcing filler consisting of silica $SiO_2$ and less than 20 phr of carbon black into the synthetic polyisoprene thus grafted with the modifier, by thermomechanically kneading everything, in one or more steps, until a maximum temperature of between 110° C. and 200° C. is reached,
cooling the combined mixture to a temperature of less than 100° C.,
then incorporating a chemical crosslinker,
kneading everything up to a maximum temperature of less than 120° C.,
extruding the resulting rubber composition in order to obtain a profiled element for a tread,
assembling the various semi-finished elements that make up the tire, including the tread formed above.

14. A process for manufacturing a heavy-duty vehicle tire comprising preparing the rubber composition of the tread, which comprises:
    incorporating into polyisoprene, a modifier comprising at least one group Q, and at least one group A, which are joined to one another by at least one "spacer" group Sp, in which:
    Q comprises a nitrile oxide, nitrone or nitrile imine function,
    A comprises an associative group comprising at least one nitrogen atom,
    Sp is a $C_1$ to $C_{24}$ group forming a bond between Q and A,
    subsequently incorporating between 30 and 150 phr of a reinforcing filler consisting of silica $SiO_2$ and less than 20 phr of carbon black, and also all the base constituents of the composition, with the exception of a chemical crosslinking system, by thermomechanically kneading everything, in one or more steps, until a maximum temperature of between 110° C. and 200° C. is reached,
    cooling the combined mixture to a temperature of less than 100° C.,
    then incorporating a chemical crosslinking system,
    kneading everything up to a maximum temperature of less than 120° C.,
    extruding the resulting rubber composition in order to form the tread,
    assembling the various semi-finished elements that make up the tire, including the tread formed above.

* * * * *